United States Patent
Li et al.

(10) Patent No.: US 12,372,967 B2
(45) Date of Patent: Jul. 29, 2025

(54) VISUAL ROBOT POSE ESTIMATION

(71) Applicant: Locus Robotics Corp., Wilmington, MA (US)

(72) Inventors: Changchun Li, Concord, MA (US); Stephen V. Williams, Portland, OR (US)

(73) Assignee: Locus Robotics Corp., Wilmington, MA (US)

( * ) Notice: Subject to any disclaimer, the term of this patent is extended or adjusted under 35 U.S.C. 154(b) by 79 days.

(21) Appl. No.: 18/454,126

(22) Filed: Aug. 23, 2023

(65) Prior Publication Data

US 2025/0068165 A1 Feb. 27, 2025

(51) Int. Cl.
*G05D 1/00* (2024.01)

(52) U.S. Cl.
CPC ......... *G05D 1/0225* (2013.01); *G05D 1/0246* (2013.01)

(58) Field of Classification Search
CPC ..................... G05D 1/0225; G05D 1/0246
See application file for complete search history.

(56) References Cited

U.S. PATENT DOCUMENTS

| | | | | |
|---|---|---|---|---|
| 2010/0328682 A1* | 12/2010 | Kotake | ............. | G01B 11/25 356/620 |
| 2016/0239976 A1* | 8/2016 | Fathi | ............. | G06T 7/579 |
| 2017/0116735 A1* | 4/2017 | Aughey | ............. | G06V 20/17 |
| 2019/0155296 A1 | 5/2019 | Moore et al. | | |
| 2022/0292711 A1* | 9/2022 | Pan | ............. | G06T 7/38 |
| 2023/0196608 A1* | 6/2023 | Ivanov | ............. | G06T 7/75 382/195 |

FOREIGN PATENT DOCUMENTS

CN 109493384 A 3/2019

OTHER PUBLICATIONS

Mncent Lepetit et al., "EPnP: An Accurate O(n) Solution to the PnP Problem," International Journal of Computer Vision, vol. 81, No. 2, 2009, pp. 155-166.

(Continued)

Primary Examiner — Hunter B Lonsberry
Assistant Examiner — Harrison Heflin
(74) Attorney, Agent, or Firm — Sunstein LLP

(57) ABSTRACT

A method for estimating a pose of a robot using two co-planar points on an object plane in the environment and two co-planar lines on the object plane, includes capturing with a camera on the robot an image of the object in the environment, including two observed points corresponding to the two co-planar points on the object and two observed lines corresponding to the two co-planar lines on the object; projecting onto the image plane the two co-planar points to obtain two projected points and projecting the two co-planar lines to obtain two projected lines; determining a point projection error by comparing the two projected co-planar points to corresponding observed points; determining a line projection error by comparing the two projected co-planar lines to corresponding observed lines; and estimating a current robot pose if the point projection error and the line projection error are below a predetermined error threshold.

18 Claims, 9 Drawing Sheets

(56) References Cited

OTHER PUBLICATIONS

Jin Han Lee et al., "Outdoor Place Recognition in Urban Environments Using Straight Lines," 2014 IEEE International Conference on Robotics & Automation (ICRA), 2017, pp. 5550-5557.
Adnan Ansar et al., "Linear Pose Estimation from Points or Lines*," IEEE Transactions on Pattern Analysis and Machine Intelligence, vol. 25, Issue 5, May 2003, pp. 282-296.
ISA/EP; International Search Report and Written Opinion dated Nov. 29, 2024 for PCT application No. PCT/US2024/041281; 14 pages.
Oberkampf et al., "Iterative Pose Estimation Using Coplanar Feature Points," Computer Vision and Image Understanding, Academic Press, US, vol. 63, Issue No. 3, May 1996, pp. 495-511.

* cited by examiner

VISUAL ROBOT POSE ESTIMATION

TECHNICAL FIELD

The present invention relates to robot pose estimation in an environment and more particularly to robot pose estimation when the robot is in close proximity to an object, for example, an electrical charging station.

BACKGROUND ART

In many applications, robots, such as autonomous mobile robots (AMRs), are used to perform functions in place of humans or to assist humans in order to increase productivity and efficiency. One such application is order fulfillment, which is typically performed in a large warehouse filled with products to be shipped to customers who have placed their orders over the internet for home delivery. Fulfilling such orders in a timely, accurate and efficient manner is logistically challenging to say the least.

An important goal of the order fulfillment process is thus to ship as many items in as short a time as possible. The process of receiving an order, planning its fulfillment, finding the storage shelf or bin, picking the product, and repeating the process for each item on the order, then delivering the order to a shipping station is repetitive and labor intensive. In a warehouse stocked with thousands or tens of thousands of items of rapidly turning inventory, robots play a critical role in ensuring timely and efficient order fulfillment. In addition, the products that will ultimately be shipped first need to be received in the warehouse and stored or "placed" in storage bins in an orderly fashion throughout the warehouse so they can be readily retrieved for shipping.

The robots are powered by electricity, which is stored in on-board batteries. With the extensive travelling that the robots do in the warehouse they must be regularly recharged. Therefore, for the operation to run smoothly, an efficient and effective way to charge the robots is a requirement.

The robots may be configured to automatically dock with a dedicated charging station in order to keep the vehicle batteries charged and thus provide continuous operation without manual intervention. The robots typically use multiple sensors to locate the charging station and accurately mate a charge port on the robot with a charge connector on the charging station to provide a path for electrical current to flow into and charge the robot's batteries.

The primary navigation sensor for a typical robot is a laser range finding device (Lidar). However, Lidar device accuracy may not always be sufficient to accurately dock at a charging station. For this reason, a vision system (e.g. camera and computer software) is typically used as a secondary sensor to accurately locate and mate with the charging station's charge connector. In order to dock at the charging station, the robot may navigate to a defined pose associated with the charging station and the vision system may be used to accurately estimate the pose of the robot using images of the charging station. Accurately locating the pose may be challenging, in particular, when the robot is in close proximity to the charging station.

SUMMARY OF THE EMBODIMENTS

In accordance with one embodiment of this disclosure, there is a method for estimating a pose of a robot traveling in an environment using two co-planar points (P1, P2) on an object plane on an object in the environment and two co-planar lines (P1-A, P2-B) on the object plane on the object. The method includes capturing with a camera on the robot an image of the object in the environment, the image formed on an image plane of the camera including two observed points (op1, op2) corresponding to the two co-planar points (P1, P2) on the object; the image further including two observed image lines (op1-a, op2-b) corresponding to the two co-planar lines (P1-A, P2-B) on the object. The method also includes projecting onto the image plane of the camera the two co-planar points (P1, P2) on the object plane to obtain two projected co-planar image points (pp1, pp2) and projecting the two co-planar lines (P1-A, P2-B) on the object plane to obtain two projected co-planar image lines (pp1-a, pp2-b). The method further includes determining a point projection error by comparing the two projected co-planar image points (pp1, pp2) to corresponding observed points (op1, op2) and determining a line projection error by comparing the two projected co-planar image lines (pp1-a, pp2-b) to corresponding observed image lines (op1-a, op2-b). The method additional includes estimating a current robot pose if the point projection error and the line projection error are below a predetermined error threshold.

The method may include one or more of the following features or aspects. There may further be included combining the point projection error and the line projection error to establish a combined error, $E_{total}$, and comparing the $E_{total}$ to the predetermined error threshold. There may be included performing a non-linear optimization on the two observed points (op1, op2) relative to the two projected points (pp1, pp2) and the two observed image lines (op1-a, op2-b) and relative to the two projected co-planar image points (pp1, pp2) before determining the combined error, $E_{total}$. If the combined error, $E_{total}$, is not less than the error threshold, the method further includes performing, using the processor and memory, a a non-linear optimization on the two observed points (op1, op2) relative to the two projected points (pp1, pp2) and the two observed image lines (op1-a, op2-b) and re-determining the combined error, $E_{total}$. The point projection error may be determined using the following formula:

$$E_{points} = \sum_i \|q_i - s_i\|$$

wherein $q_i$ are the projected points on image plane and $s_i$ are the observed points on the image plane. The line projection error may be determined using the following formula:

$$E_{lines} = \left\| \overrightarrow{n_{ae}} - \overrightarrow{n'_{ae}} \right\| + \left\| \overrightarrow{n_{bf}} - \overrightarrow{n'_{bf}} \right\|$$

wherein $n_{ae}$ and $n'_{ae}$ are the projected lines on image plane and $n_{bf}$ and $n'_{bf}$ are the observed lines on the image plane. The combined point projection error and line projection error may be determined using the following formula:

$$E_{total} = w_{points} E_{points} + w_{lines} E_{lines} =$$
$$w_{points} \sum_i \|q_i - s_i\| + w_{lines} \left( \left\| \overrightarrow{n_{ae}} - \overrightarrow{n'_{ae}} \right\| + \left\| \overrightarrow{n_{bf}} - \overrightarrow{n'_{bf}} \right\| \right)$$

wherein $W_{points}$ and $W_{lines}$ are the weighting factors to balance the two kinds of errors. The environment may be a warehouse and the object may be an electric charging station for the robot in the warehouse.

In accordance with another embodiment of this disclosure, there is a robot traveling in an environment, estimating a robot pose using two co-planar points (P1, P2) on an object plane on an object in the environment and two co-planar lines (P1-A, P2-B) on the object plane on the object. The robot includes a mobile base unit, a camera on the mobile base unit. There is a processor and a memory storing instructions that, when executed by the processor, cause the robot to capture with the camera an image of the object in the environment, the image formed on an image plane of the camera including two observed points (op1, op2) corresponding to the two co-planar points (P1, P2) on the object; the image further including two observed image lines (op1-a, op2-b) corresponding to the two co-planar lines (P1-A, P2-B) on the object. The memory stores instructions that, when executed by the processor, project onto the image plane of the camera the two co-planar points (P1, P2) on the object plane to obtain two projected co-planar image points (pp1, pp2) and projecting the two co-planar lines (P1-A, P2-B) on the object plane to obtain two projected co-planar image lines (pp1-a, pp2-b). The robot determines a point projection error by comparing the two projected co-planar image points (pp1, pp2) to corresponding observed points (op1, op2) and it determines a line projection error by comparing the two projected co-planar image lines (pp1-a, pp2-b) to corresponding observed image lines (op1-a, op2-b), The robot further estimates a current robot pose if the point projection error and the line projection error are below a predetermined error threshold.

The robot may include one or more of the following features or aspects. The memory may further include instructions that, when executed by the processor, cause the robot to combine the point projection error and the line projection error to establish a combined error, $E_{total}$, and comparing the $E_{total}$ to the predetermined error threshold and it may perform a non-linear optimization on the two observed points (op1, op2) relative to the two projected points (pp1, pp2) and the two observed image lines (op1-a, op2-b) and relative to the two projected co-planar image points (pp1, pp2) before determining the combined error, $E_{total}$. If the combined error, $E_{total}$, is not less than the error threshold, the memory of the robot may further include instructions that, when executed by the processor, cause the robot to further perform a a non-linear optimization on the two observed points (op1, op2) relative to the two projected points (pp1, pp2) and the two observed image lines (op1-a, op2-b) and re-determining the combined error, $E_{total}$. The point projection error may be determined using the following formula:

$$E_{points} = \sum_i \|q_i - s_i\|$$

wherein $q_i$ are the projected points on image plane and $s_i$ are the observed points on the image plane. The line projection error may be determined using the following formula:

$$E_{lines} = \left\|\overrightarrow{n_{ae}} - \overrightarrow{n'_{ae}}\right\| + \left\|\overrightarrow{n_{bf}} - \overrightarrow{n'_{bf}}\right\|$$

wherein $n_{ae}$ and $n'_{ae}$ are the projected lines on image plane and $n_{bf}$ and $n'_{bf}$ are the observed lines on the image plane.

The combined point projection error and line projection error may be determined using the following formula:

$$E_{total} = w_{points}E_{points} + w_{lines}E_{lines} =$$
$$w_{points}\sum_i \|q_i - s_i\| + w_{lines}\left(\left\|\overrightarrow{n_{ae}} - \overrightarrow{n'_{ae}}\right\| + \left\|\overrightarrow{n_{bf}} - \overrightarrow{n'_{bf}}\right\|\right)$$

wherein $W_{points}$ and $W_{lines}$ are the weighting factors to balance the two kinds of errors. The environment may be a warehouse. The object may be an electric charging station for the robot in the warehouse.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
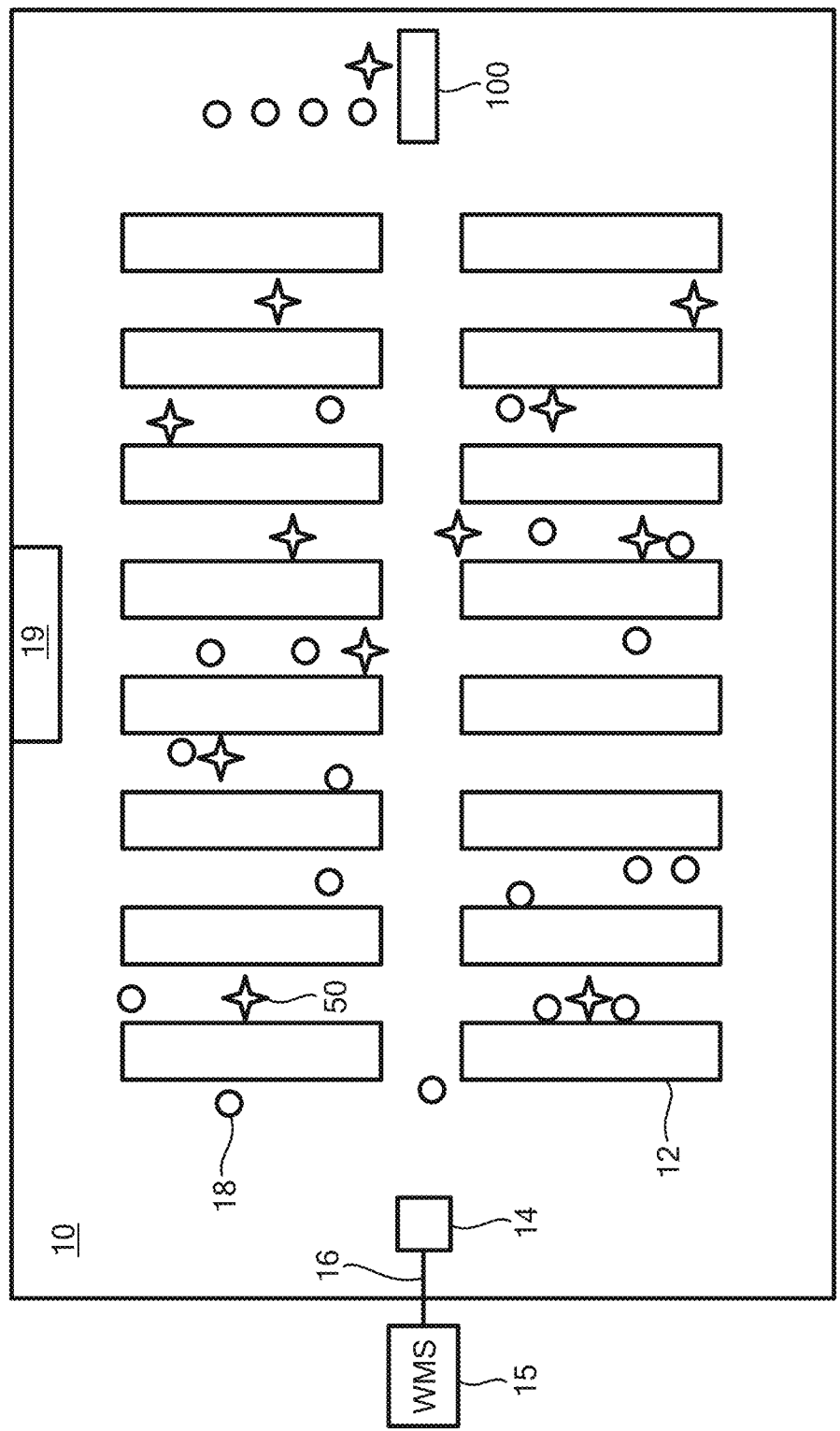
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The disclosure is directed to robot pose estimation in an environment using a robot vision system and more particularly to robot pose estimation when the robot is in close proximity to an object, wherein an image of the object is used to determine the robot pose. One exemplary situation where this pose estimation technique is useful is when the robot is docking at an electrical charging station to recharge its batteries and the vision system on the robot is only able to capture an image of a portion of the charging station needed to do the pose estimation. For example, an image of the charge connector on the charging station may be used to determine pose location of the robot. However, when in close proximity, a sufficient portion of the charge connector may not be captured to allow for accurate pose determination.

While not restricted to any particular robot application, or to any particular object in an environment, in order to provide context, the pose estimation technique herein is described in an order fulfillment application in a warehouse environment. Moreover, the object used in this is description is an electrical charging station. Of course, the pose estimation technique herein could be used in various robot applications and using various objects and is not limited to those described herein.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10. Also shown is charging area 19, which is where one or more charging stations according to an aspect of the invention may be located.

Figure 2B:
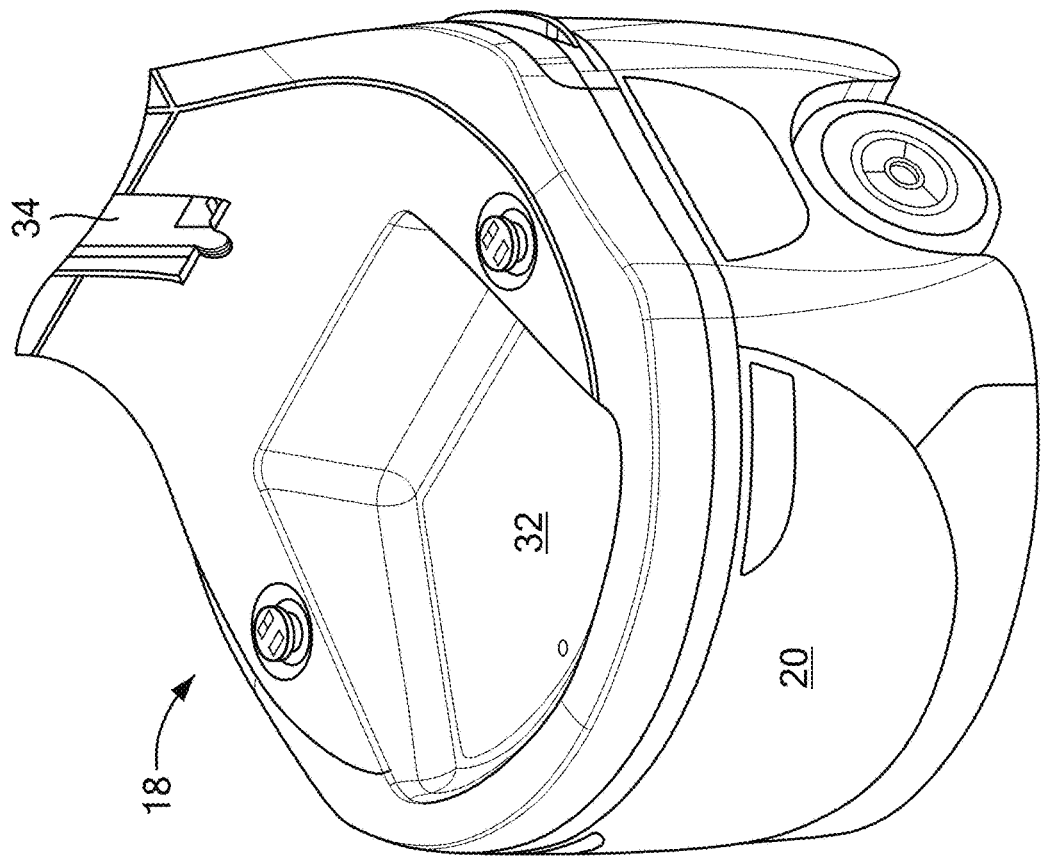
FIG. 2B is a perspective view of a base of one of the robots used in the warehouse shown in FIG. 1.
Figure 2A:
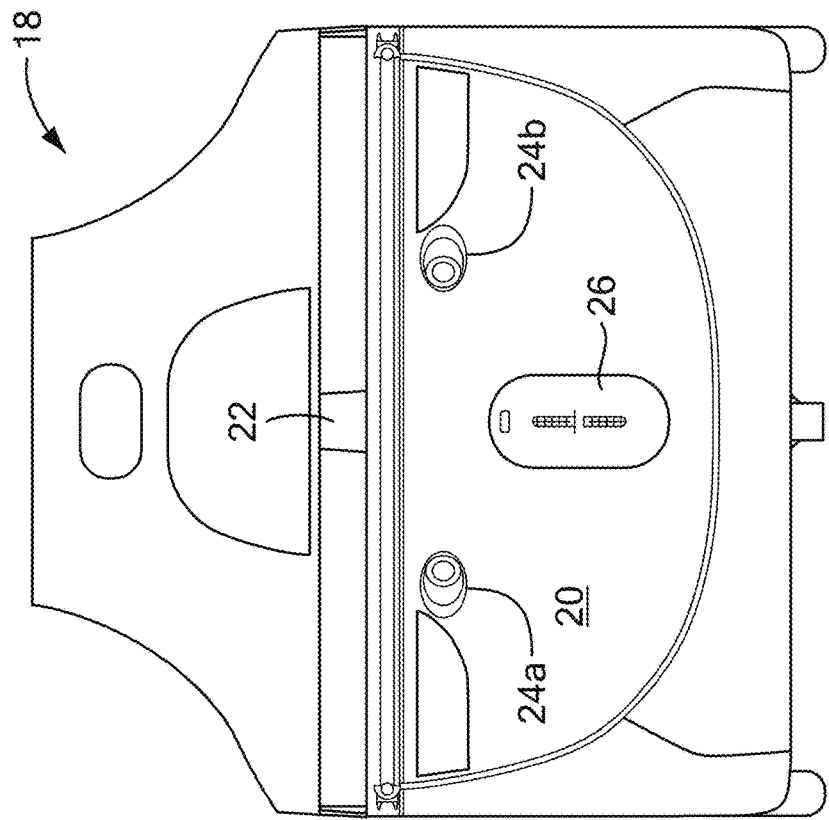
FIG. 2A is a front elevational view of a base of one of the robots used in the warehouse shown in FIG. 1.
Figure 3:
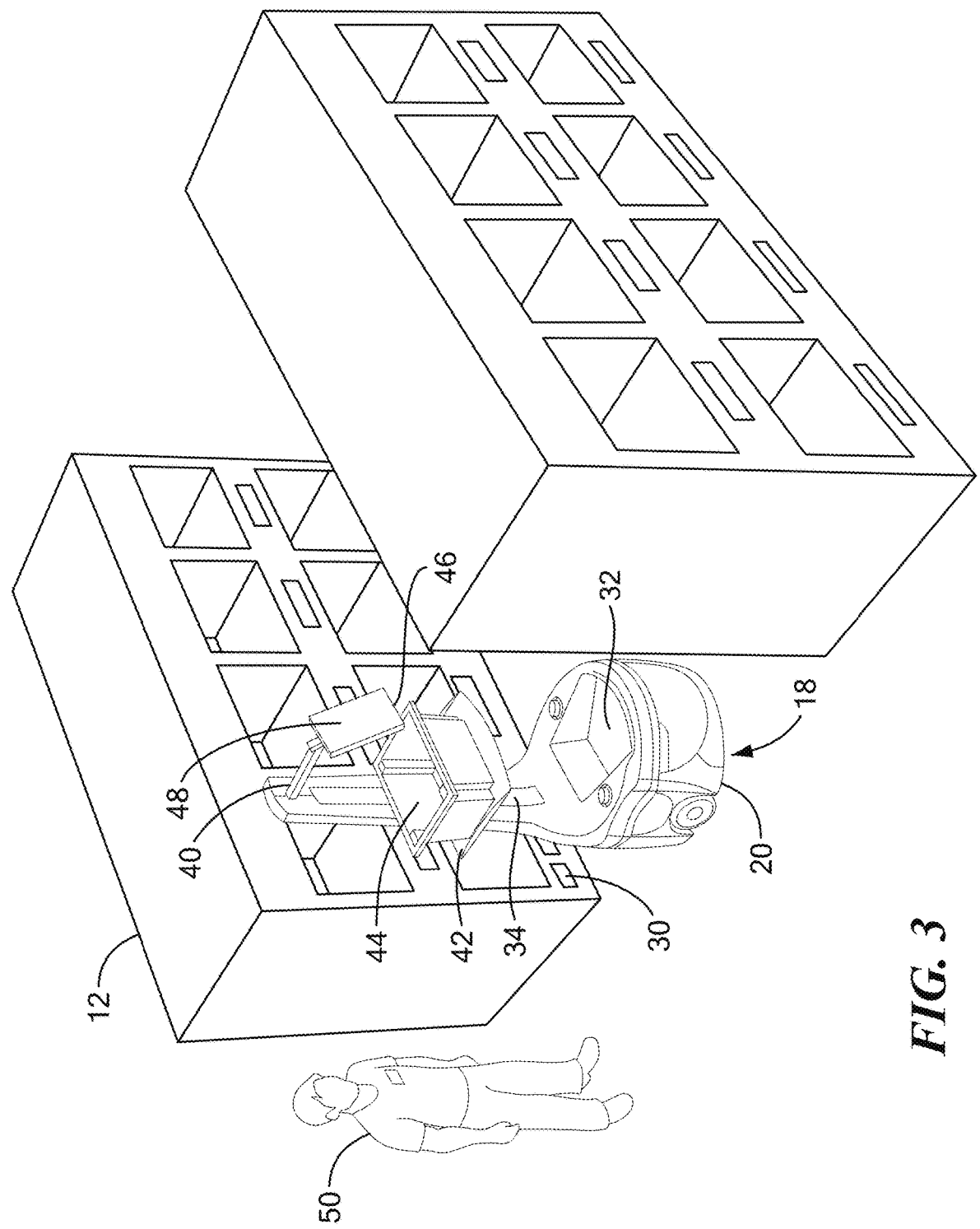
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, may include an autonomous wheeled base 20 having a laser-radar 22. The base 20 may include a transceiver (not shown) that enables the robot 18 to receive instructions from the order-server 14, and a pair of digital optical cameras 24a and 24b. The instructions may include an assignment of one or more customer orders (each order may include one of more items) to fulfil in the warehouse. The robot base may also include an electrical charging port or connector 26 for re-charging the batteries which power autonomous wheeled base 20. The base 20 further features a processor (not shown) that receives data from the laser-radar 22 and cameras 24a and 24b to capture information representative of the robot's environment. There is a memory (not shown) that operates with the processor to carry out various tasks associated with navigation within the warehouse 10, including to navigate to fiducial markers, e.g. fiducial marker 30 placed on shelves 12, as shown in FIG. 3, which corresponds to a one or more bins containing items. Various navigation approaches may be used to enable the robot to navigate, but one exemplary one is described in U.S. Pat. No. 10,429,847. This disclosure is not limited to robot systems using fiducial markers associated with pose locations and is simply an exemplary approach used to describe the features of this disclosure.

Fiducial marker 30 (e.g. a two-dimensional bar code), FIG. 3, corresponds to one or more bins containing items that the robot may retrieve. Each fiducial marker also corresponds to a pose (i.e. a location) on the floor of the warehouse. Therefore, when the robot needs to retrieve an item from a particular bin, the fiducial marker and its associated pose is determined and the robot navigates to the pose, where a worker, such worker 50 may assist the robot to retrieve the item(s) from the bin.

The fiducial markers are also used to identify charging stations and the fiducial marker associated with a charging station includes an associated pose on the warehouse floor that the robot will navigate to when charging is desired. When arriving at the pose of the charging station the robot's charge connector 26 will be mated with a corresponding charge port of the charging station. The navigation approach to position the robot near the charging station pose may be the same as used to navigate the robot to fiducial markers associated with bin locations, as described above. However, more precise navigation may be required to navigate the robot to the charging station pose. There is more precision required for arriving at the pose for the charging station in order to properly mate the robot to the charging station. More precise approaches are described in U.S. Pat. No. 10,365,656. However, when the robot is in very close proximity to the charging station, an alternative approach, such as the one disclosed herein, may be desired.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Figure 4:
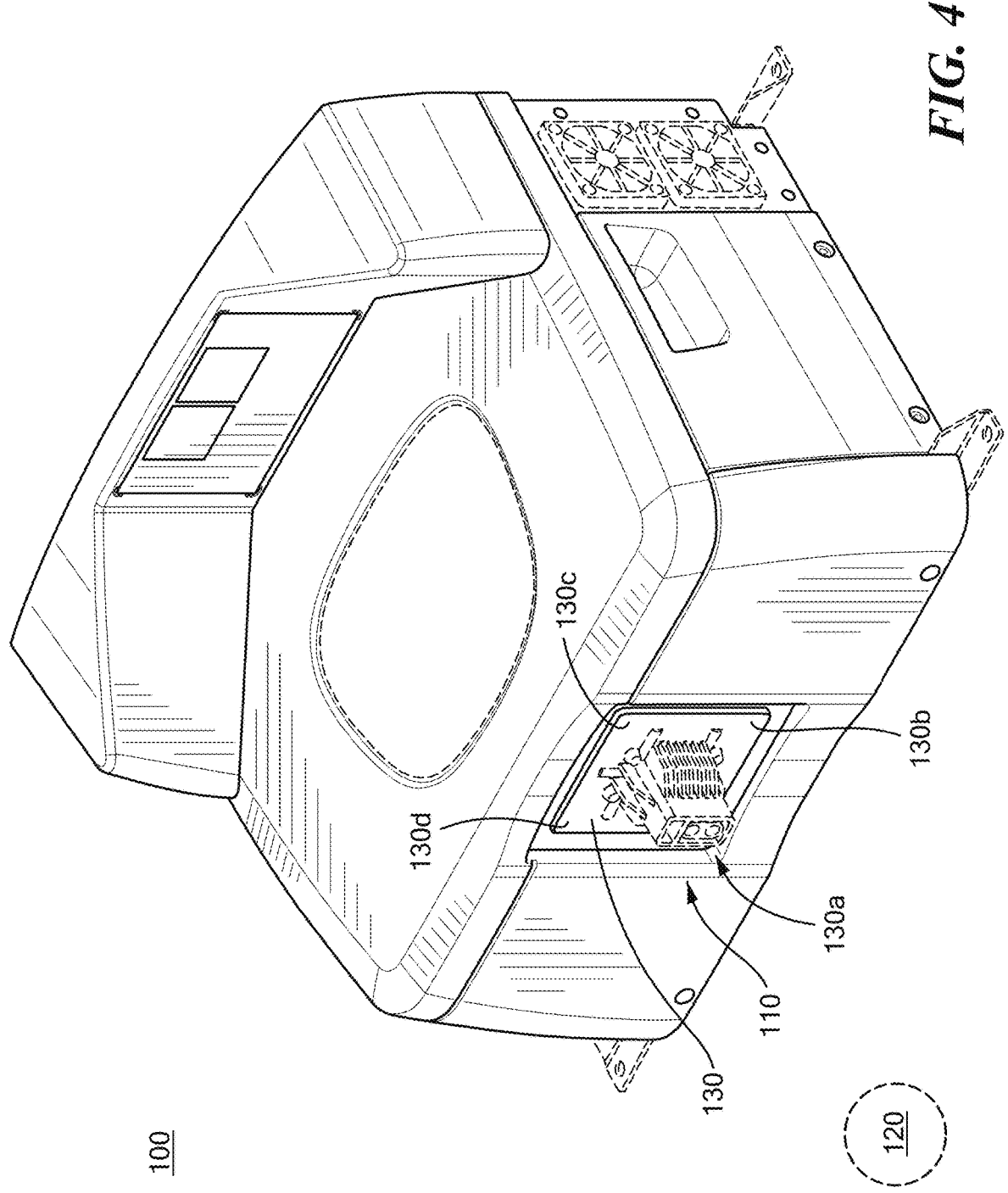
FIG. 4 is a perspective view of a charging station according to an aspect of this disclosure.

Referring to FIG. 4, a robot charging station 100, according to an aspect of this disclosure, is depicted. Charging station 100 includes a charge connector 110 configured to mate with a charging port of robot 18 (FIGS. 2 and 3) to enable the robot to recharge when needed. It should be noted that functional and design aspects of charging station 100 and charge connector 110 are merely exemplary and should not be considered limiting. Robot charging station 100 includes an external cover, which may be made of a hard plastic, opaque material, which may comprise several cover components. Also, depicted in this figure is charging station pose 120, which is the location on the floor of the warehouse associated with a fiducial marker (not shown) placed on the charging station. Note, that while this embodiment uses a fiducial marker and an associated pose, this is not a requirement. A pose alone (no fiducial marker) associated with the charging station may be used as well.

As indicated above, the primary navigation sensor for a typical robot is a laser range finding device (Lidar). However, Lidar device accuracy may not always be sufficient to accurately dock at a charging station 100, particularly when in close proximity to the charging station as the robot approaches pose 120. For this reason, a vision system (e.g. camera(s) and computer software), e.g. cameras 24a and 24b of FIG. 2A, is/are used as a secondary sensor to accurately locate and mate with the dock's charge connector by determining from the images the pose of the camera and of the robot in order to arrive at the charging station pose.

Current pose estimation methods using the robot's vision system may encounter problems when the robot is in close proximity to the charging station due to the limited image capture available. Prior art robot pose estimation techniques require imaging with the robot camera system of at least four (4) coplanar points or four (4) or more coplanar lines on the object (e.g. charging station). The coplanar points may be located at the base 130 of charge port 110, which are known positions in the warehouse environment. The points, 130a-130d, may be located at the four corners of base 130 and are therefore in the same plane (co-planar). The following are prior art approaches using multiple (four or more) coplanar points/lines.

1. Vincent Lepetit, Francesc Moreno-Noguer, and Pascal Fua. Epnp: An accurate o (n) solution to the pnp problem. *International journal of computer vision*, 81(2):155-166, 2009.
2. Lee, Jin Han et al. "Outdoor place recognition in urban environments using straight lines." 2014 *IEEE International Conference on Robotics and Automation (ICRA)* (2014): 5550-5557.
3. Adnan Ansar, Kostas Daniilidis, "Linear Pose Estimation from Points or Lines", *IEEE Transactions on Pattern Analysis and Machine Intelligence* (Volume: 25, Issue: 5, May 2003)

Figure 5A:
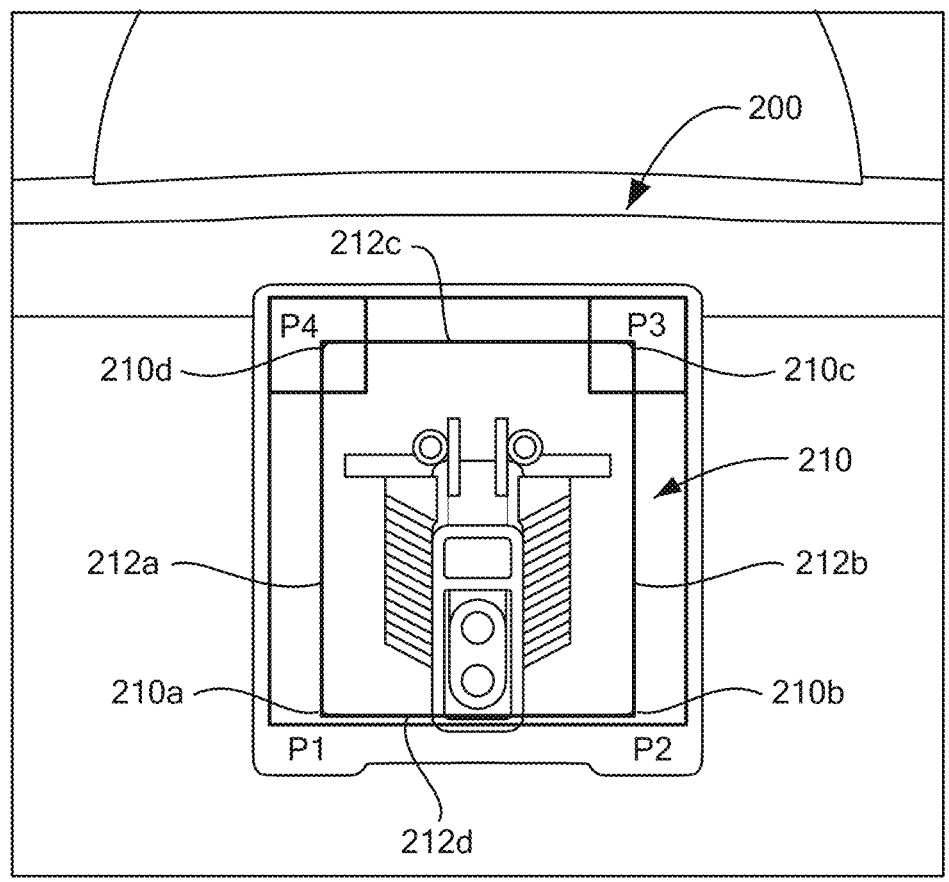
FIG. 5A is a partial view of the front of the charging station depicted in FIG. 4.
Figure 5B:
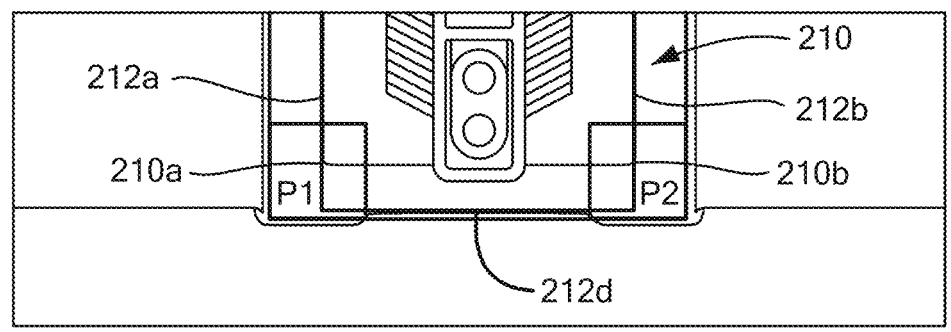
FIG. 5B is a partial view of the charging connector of the charging station depicted in FIG. 5A.

The above prior art techniques require at least four (4) points or lines. However, in certain cases, where four points/four lines are not available, these approaches are not able to accurately determine the pose of the robot. This problem is depicted in FIGS. 5A and 5B. In FIG. 5A, the position of the robot relative to charging station 200 is such that the full charge port 210 is visible by the camera and the image captured includes four corner points 210a-210d (P1-P4) as well as four (4) lines 212a-212d which connect the four corner points. The corner points 210a-210d are co-planar and on a plane formed by connecting the four points on the face of the charge port 210. The plane may be referred to herein as an object plane, as it is a plane on an object (e.g. the charging station) in the environment. The position of the object plane and the points/lines in the environment is known. With knowledge of four points/four lines the prior art solutions can determine camera and robot pose.

However, in FIG. 5B, the position of the robot relative to charging station 200 is such that the less than the full charge port 210 is visible by the camera and the captured image in this case includes only two (2) corner points 210a (P1) and 210b (P2) and only two (2) lines 212a and 212b. Therefore, the prior art solutions will not accurately determine the pose of the robot.

The solution, according to an aspect of this disclosure, requires only two points and two lines passing through each point to determine the pose of the camera affixed to the robot and from the camera pose the robot pose may be determined as is known in the art. The two points and lines also lie in the same plane, as described above.

Figure 6:
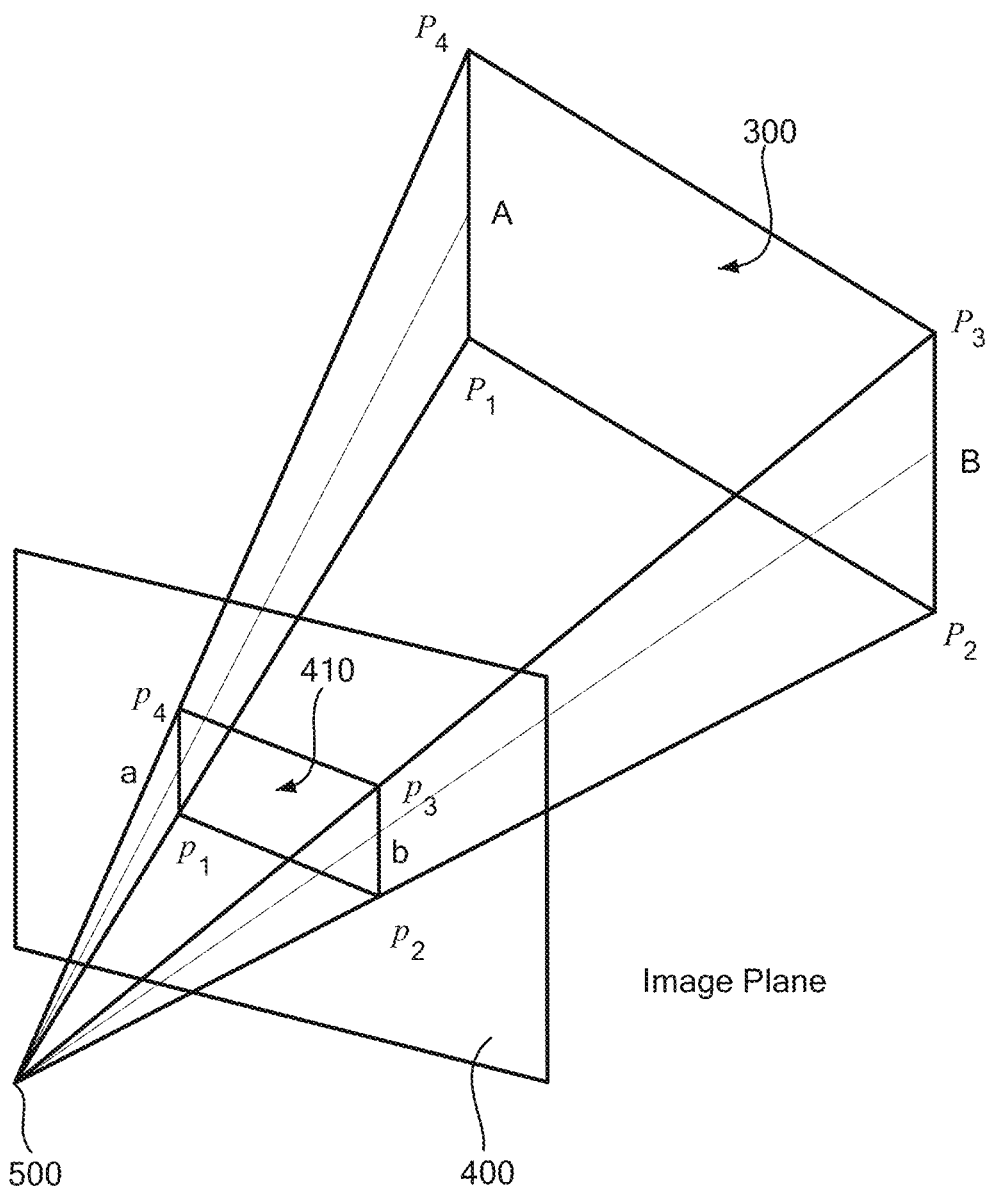
FIG. 6 is a geometric representation of the object plane and camera image plane according to an aspect of the disclosure.

Referring to FIG. 6, an object plane 300 which is a representation of the plane in which points 210a-210d (FIGS. 5A and 5B) lie is defined by points P1, P2, P3, and P4 that correspond to the four corner points 210a-210d in FIGS. 5A and 5B. Also shown on the object plane are line A formed by connecting points P1 and P4 and line B formed by connecting points P2 and P3.

There is a camera image plane 400, that correspond to the plane of the image sensor in the camera on the robot capturing the image of the object/charging station, in particular the image of the object plane 300 and the points/lines thereon. The image actually captured by the camera on the image sensor will be referred to as the observed image and will be discussed in more detail below. What is depicted in FIG. 6 on the image plane is not the observed image, but rather the projected image (i.e. mathematical projection of points/lines from the object plane to the image plane) that is represented as portion 410 of image plane 400. Image portion 410 includes projected points p1-p4 at the four corners of image portion 410 corresponding to the four corner points P1-P4 of the object plane 300. Image portion 410 also includes projected lines a and b formed by connecting points p1-p4 and p2-p3.

Continuing to refer to FIG. 6, the intersection of the lines connecting each of the four corners (P1-P4) of the object plane 300 and the four corners (p1-p4) of the image plane 400, there is depicted a point 500. This point 500 may be referred to as the pose or location of the camera on the robot. The camera pose 500 may be used to determine the pose of the robot on which the camera is mounted, as is known in the art.

Figure 7:
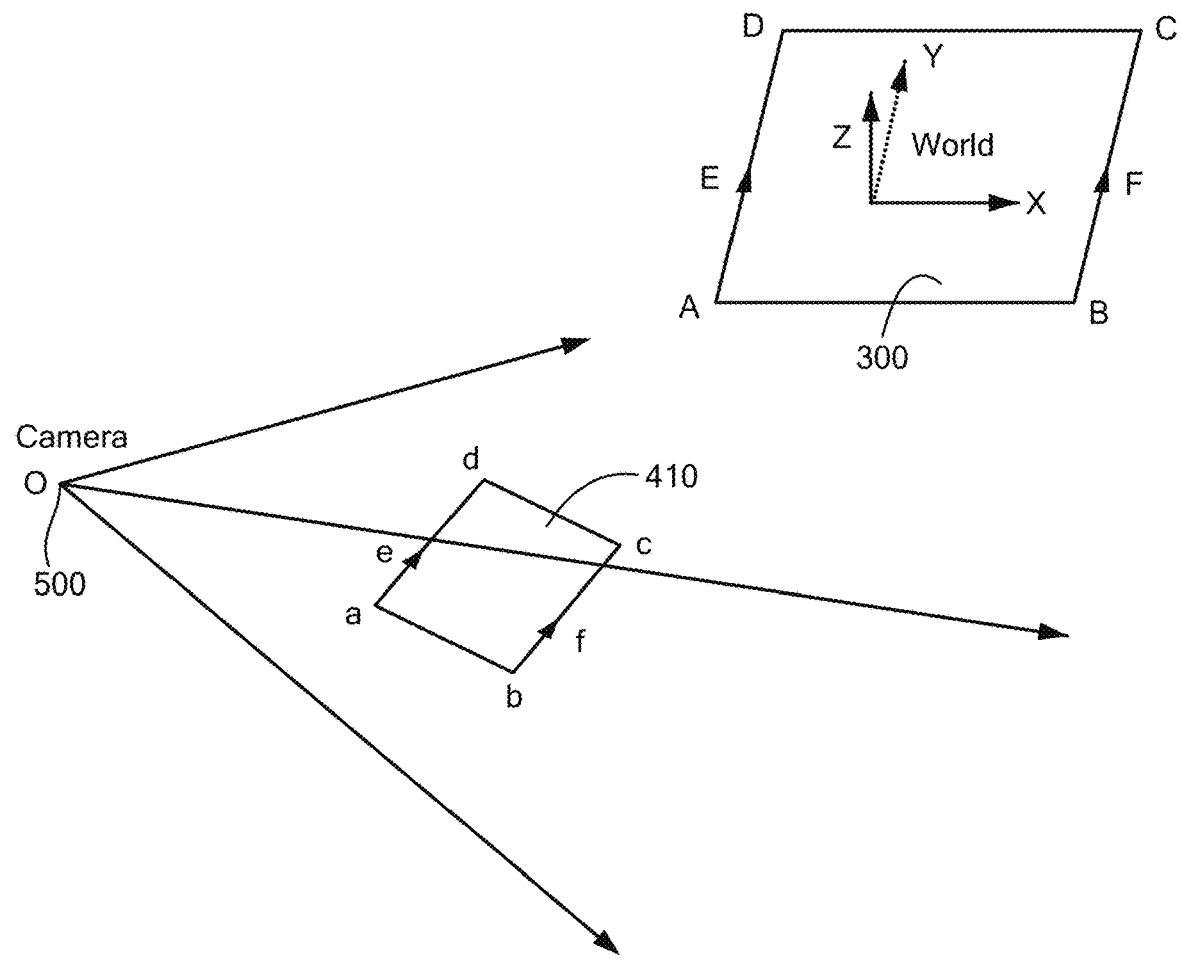
FIG. 7 is an alternate geometric representation of the object plane and of the camera image plane according to an aspect of the disclosure.

Referring now to FIG. 7, object plane 300 and the image plane 400/410 are depicted in a slightly different manner. In this case, the points on the object plane 300 are labelled A-D and the projected points on the image plane 410 are labelled a-d. These points and lines formed by the points are used to show how the projections and pose error estimations are made.

In FIG. 7, points A and B are two known 3D points on plane 300 of the object, in this case a charging station. Lines AD and BC are also on the same plane 300. Points a and b are the projected points on image plane 400/410 of A and B, respectively. Lines ad and bc are two image lines projected from AD and BC, respectively. A unique solution for the projection can be estimated to represent the 3D points in homogeneous format. If the camera parameters are known as K, the 3D point projection to image points can be represented as follows:

$$A = \begin{bmatrix} x_A \\ y_A \\ 0 \\ 1 \end{bmatrix} \quad B = \begin{bmatrix} x_B \\ y_B \\ 0 \\ 1 \end{bmatrix} \quad (1)$$

$$a = \begin{bmatrix} u_a \\ v_a \\ 1 \end{bmatrix} \quad b = \begin{bmatrix} u_b \\ v_b \\ 1 \end{bmatrix} \quad (2)$$

$$S \begin{bmatrix} u \\ v \\ 1 \end{bmatrix} = K[R \ T] \begin{bmatrix} X_w \\ Y_w \\ 0 \\ 1 \end{bmatrix} \quad (3)$$

The above formulas can be combined as follows:

$$\begin{bmatrix} u \\ v \\ 1 \end{bmatrix} = \frac{1}{S} K[R_{01} \ R_{02} \ T] \begin{bmatrix} X_w \\ Y_w \\ 1 \end{bmatrix} = H_{3 \times 3} \begin{bmatrix} X_w \\ Y_w \\ 1 \end{bmatrix} \quad (4)$$

The two directional lines on 3D plane are given as:

$$\vec{n_A} = \begin{bmatrix} n_{A_x} \\ n_{A_y} \\ 0 \end{bmatrix} \quad \vec{n_B} = \begin{bmatrix} n_{B_x} \\ n_{B_y} \\ 0 \end{bmatrix} \quad (5)$$

In a similar fashion, the two directional lines projected on the image plane may be given as:

$$\vec{n_a} = \begin{bmatrix} n_{a_x} \\ n_{a_y} \end{bmatrix} \quad \vec{n_a} = \begin{bmatrix} n_{a_x} \\ n_{a_y} \end{bmatrix} \quad (6)$$

From the projected points a point projection error can be determined relative to the observed points on the image plane. The observed points are the actual imaged points of the points on the object plane. If there is an error between the observed points/lines and the projected points/lines, an accurate camera pose estimation and hence a robot pose estimation is not possible.

For the point projection errors we start with the projected points on image plane are represented as follows:

$$S_i = \begin{bmatrix} u_i \\ v_i \end{bmatrix} \quad (7)$$

The matching points observed on the image plane are:

$$q_i = \begin{bmatrix} u'_i \\ v'_i \end{bmatrix} \quad (8)$$

Therefore, the point projection errors are:

$$E_{points} = \sum_i \|q_i - s_i\| \quad (9)$$

For the line projection errors we start with the line from A to D represented on the object plane which is represented as:

$$P = P_A + \lambda \vec{n_{AD}} \quad (10)$$

Similarly the line from B to C is represented as:

$$P = P_B + \lambda \vec{n_{BC}} \quad (11)$$

Without losing generality, let λ=1 so that a point is taken on each object line as E and D respectively.

$$P_E = P_A + \vec{n_{AD}} \quad (12)$$
$$P_F = P_B + \vec{n_{BC}} \quad (13)$$

The points A and B are projected onto the camera image plane as a and b respectively. Points E and F are projected onto the image plane as before as e and f, respectively. However, points e and f only lie on the line and their exact location is unknown. Points E and F are assumed points on line AD and BC respectively. Points e and f are their projected points on image plane respectively. We are using points A,B,E, and F because, due to the proximity of the robot/camera with to the charging station points C and D are not captured in the image.

The projected lines are determined as follows:

$$\vec{n_{ae}} = \frac{p_e - p_a}{\|p_e - p_a\|} \quad (14)$$

$$\vec{n_{bf}} = \frac{p_f - p_b}{\|p_f - p_b\|} \quad (15)$$

Meanwhile, the observed lines on image plane is given as:

$$\vec{n'_{ae}} \quad \vec{n'_{bf}} \quad (16)$$

So there is a line direction estimation error as below:

$$E_{lines} = \left\|\vec{n_{ae}} - \vec{n'_{ae}}\right\| + \left\|\vec{n_{bf}} - \vec{n'_{bf}}\right\| \quad (17)$$

Combining the point and line estimation errors results in the following:

$$E_{total} = w_{points}E_{points} + w_{lines}E_{lines} = \quad (18)$$
$$w_{points}\sum_i \|q_i - s_i\| + w_{lines}\left(\left\|\vec{n_{ae}} - \vec{n'_{ae}}\right\| + \left\|\vec{n_{bf}} - \vec{n'_{bf}}\right\|\right)$$

$W_{points}$ and $W_{lines}$ are the weighting factors to balance the two kinds of errors.

While a combined error of points and lines is determined in the preferred approach, $E_{total}$, it is possible to calculate separate point errors and line errors and assess them individually.

The six (6) parameters are the camera position [x, y, z], and its rotation angles [roll, pitch, yaw] around x-axis, y-axis, and z-axis, respectively. These parameters could be found using a (3×3) rotation matrix however the process of described herein is used to reduce the number of parameters needed to estimate the camera pose.

Figure 8:
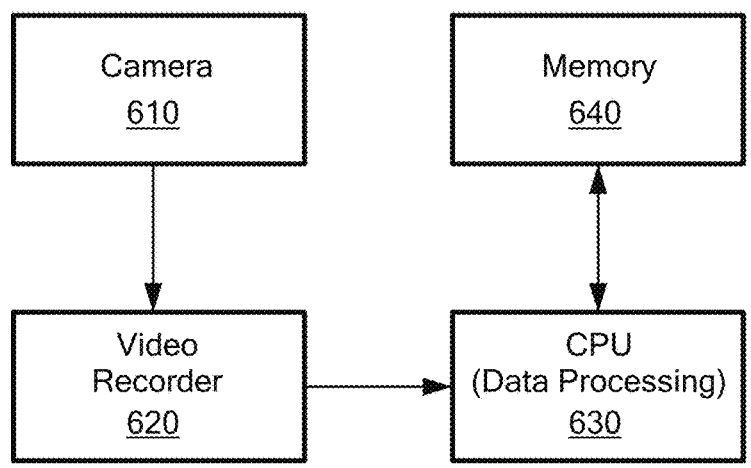
FIG. 8 is a block diagram of certain hardware components of the robot according to an aspect of this disclosure.
Figure 9:
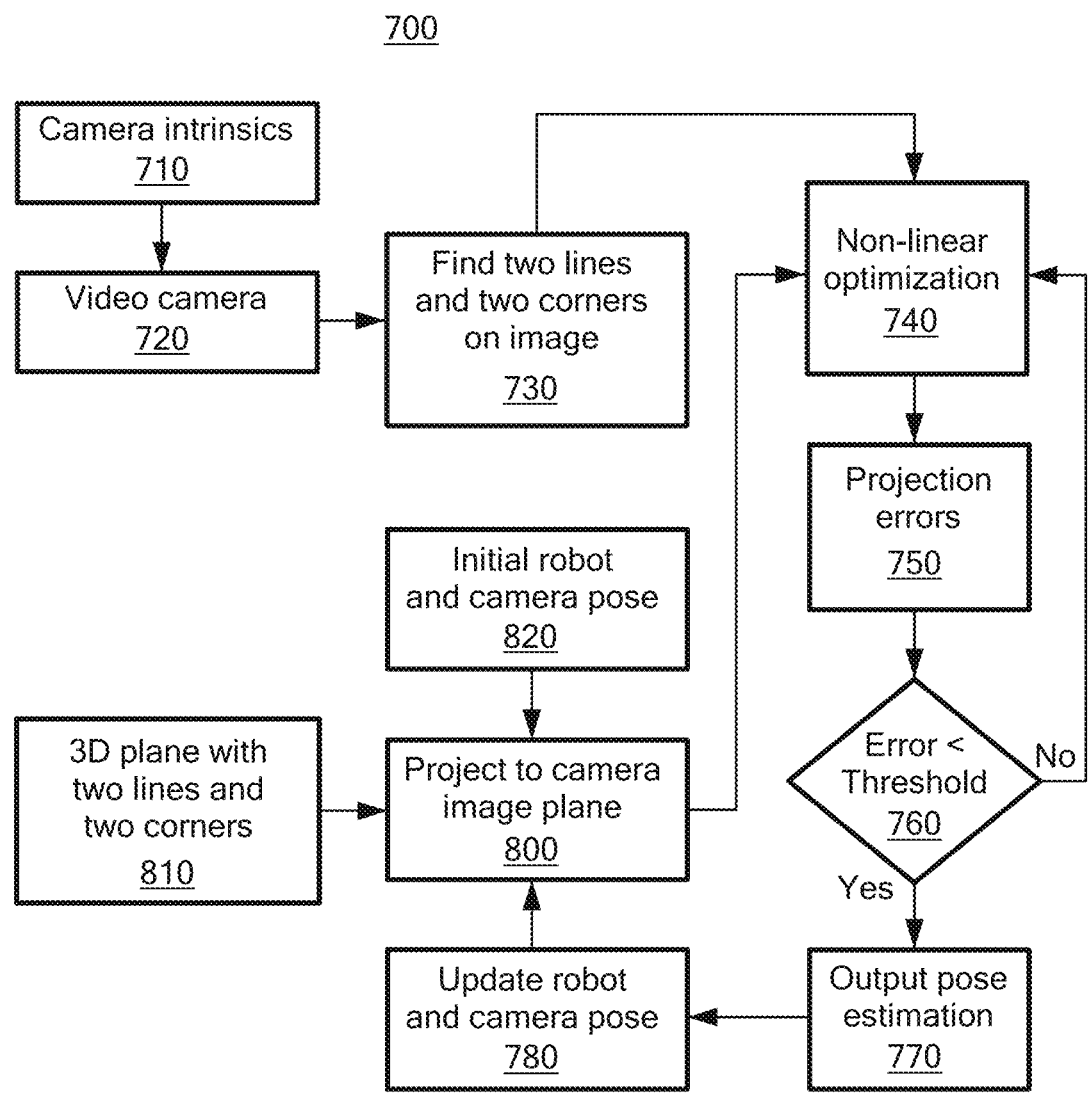
FIG. 9 is a flow chart representing a method according to an aspect of this disclosure

The above described algorithm may be implemented in an exemplary hardware system 600 as depicted in FIG. 8 and which may be used to execute the process flow in flow chart 700 of FIG. 9. The hardware and software would reside on the robot on which the camera/vision system is affixed. The camera system 610 would capture images of the environment and provide them to video decoder 620 which digitizes the captured images and provides them to a central processing unit (CPU) 630. The CPU 630 is connected to memory 640 which together can be used to process the digitized images according to flow chart 700, FIG. 9. The camera's location is calibrated or known to the robot's base location. The mentioned system shares computing resources with other parts of the robot. Therefore, once the camera's pose is determined, the pose of the robot may be determined in a known manner.

In step 710 of flow chart 700, the camera captures an image which is decoded at step 720 and provided to the data processor where step 730 is executed. In step 730, two points and two lines on the object plane are found in the image and at step 740 a non-linear optimization of the image(s) is performed using an optimizer to solve the nonlinear estimation problem, such as Google Ceres, G2O, GTSAM etc. The projection points/line error compared with the observed points/lines is undertaken, step 750, as described in the equations above, and at step 760 it is determined if the error is below a predetermined threshold indicating that the projected points/lines are sufficiently aligned in the image with the observed points/line. If the error is less than the threshold, at step 770, a new camera pose and robot pose estimation are determined and at step 780 the robot receives the updated robot and camera pose for use with the robots navigation algorithms. If at step 760, the error is not less than the predetermined threshold, further non-linear optimization is performed by looping back to step 740 and continuing the process until the error is determined to be under the threshold in step 760.

As part of the non-linear optimization step 740, a projected image is generated on the camera image plane at step 800 and is used in the optimization step. The inputs to step 800 include obtaining the two points and two lines from the object plane at step 810 and the initial robot and camera pose at step 820.

Figure 10:
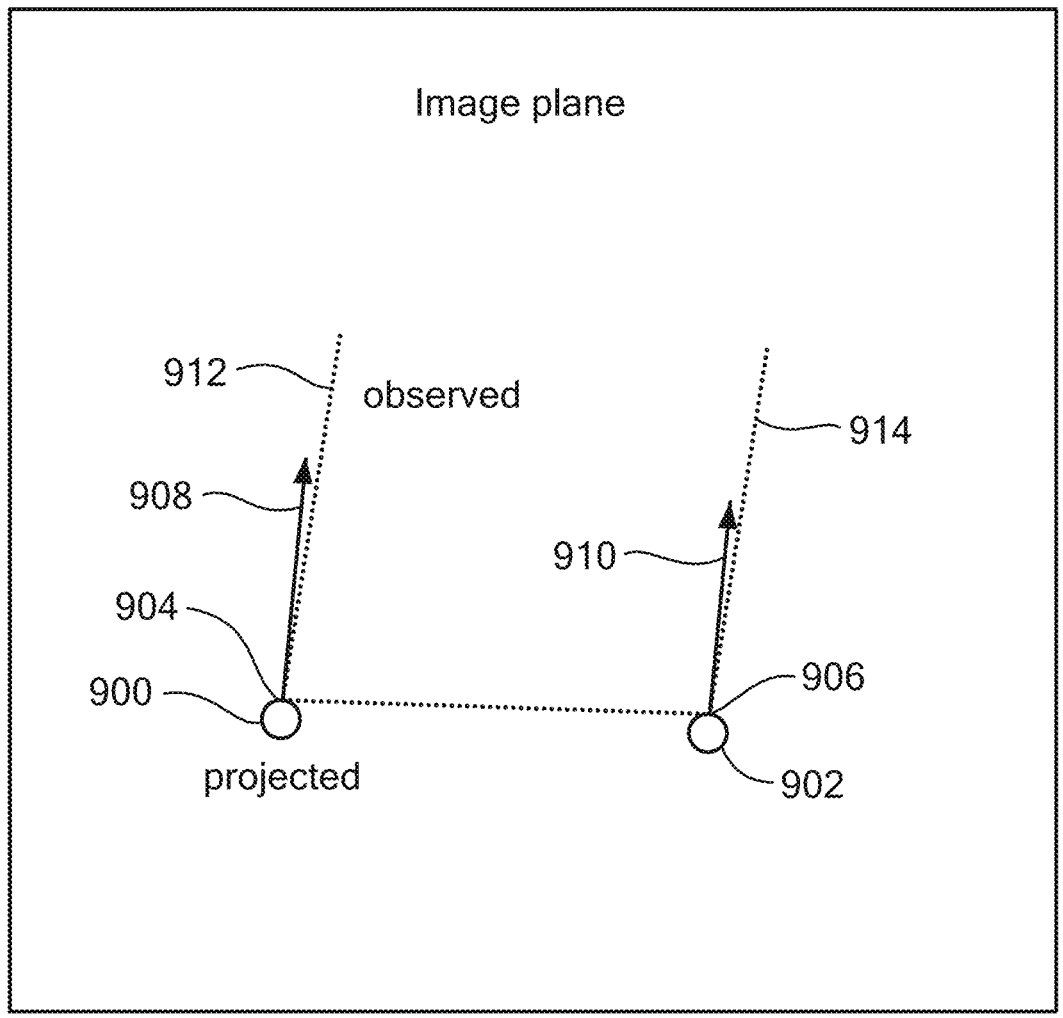
FIG. 10 is a geometric representation of the camera image plane with projected and observed points and lines depicted thereon.

FIG. 10 illustrates the error between the observed and projected points and lines on the image plane. Projected points 900 (pp1) and 902 (pp2) are slightly misaligned with observed points 904 (op1) and 906 (op2). Similarly projected lines 908 (pp1-$a$) and 910 (pp2-$b$) are slightly misaligned with observed lines 912 (op1-$a$) and 914 (op2-$b$). The optimization step 740 is used to minimize the error between the observed and projected points/lines. When the error is less than the threshold, at step 770, FIG. 9, a new camera pose and robot pose estimation are determined.

The computer program(s) used herein may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for estimating a pose of a robot traveling in an environment using two co-planar points (P1, P2) on an object plane on an object in the environment and two co-planar lines (P1-A, P2-B) on the object plane on the object, the method comprising capturing with a camera mounted on the robot images of the environment, including images of the object in the environment;

receiving camera images from the camera by a video decoder, including a camera image of the object;

decoding by the video decoder the received camera images into decoded digital images, including a decoded digital image of the object;

identifying, using a processor and memory, on the decoded digital image of the object two observed points (op1, op2) corresponding to the two co-planar points (P1, P2) on the object;

identifying, using the processor and memory, on the decoded digital image of the object two observed image lines (op1-$a$, op2-$b$) corresponding to the two co-planar lines (P1-A, P2-B) on the object;

projecting, using the processor and memory, onto the image plane of the camera the two co-planar points (P1, P2) on the object plane to obtain two projected co-planar image points (pp1, pp2) and projecting, using the processor and memory, the two co-planar lines (P1-A, P2-B) on the object plane to obtain two projected co-planar image lines (pp1-$a$, pp2-$b$);

determining, using the processor and memory, a point projection error by comparing the two projected co-planar image points (pp1, pp2) to corresponding observed points (op1, op2);

determining, using the processor and memory, a line projection error by comparing the two projected co-planar image lines (pp1-$a$, pp2-$b$) to corresponding observed image lines (op1-$a$, op2-$b$); and estimating, using the processor and memory, a current robot pose if the point projection error and the line projection error are below a predetermined error threshold.

2. The method of claim 1 further including combining, using the processor and memory, the point projection error and the line projection error to establish a combined error, $E_{total}$, and comparing the $E_{total}$ to the predetermined error threshold.

3. The method of claim 2 further including performing, using the processor and memory, a non-linear optimization on the two observed points (op1, op2) relative to the two projected points (pp1, pp2) and the two observed image lines (op1-$a$, op2-$b$) and relative to the two projected co-planar image points (pp1, pp2) before determining the combined error, $E_{total}$.

4. The method of claim 3 wherein if the combined error, $E_{total}$, is not less than the error threshold, the method further includes performing, using the processor and memory, a non-linear optimization on the two observed points (op1, op2) relative to the two projected points (pp1, pp2) and the two observed image lines (op1-*a*, op2-*b*) and re-determining the combined error, $E_{total}$.

5. The method of claim 2 wherein the point projection error is determined, using the processor and memory, according to the following formula:

$$E_{points} = \sum_i \|q_i - s_i\|$$

wherein $q_i$ are the projected points on image plane and $s_i$ are the observed points on the image plane.

6. The method of claim 5 wherein the line projection error is determined, using the processor and memory, according the following formula:

$$E_{lines} = \left\|\overrightarrow{n_{ae}} - \overrightarrow{n'_{ae}}\right\| + \left\|\overrightarrow{n_{bf}} - \overrightarrow{n'_{bf}}\right\|$$

wherein $n_{ae}$ and $n'_{ae}$ are the projected lines on image plane and $n_{bf}$ and $n'_{bf}$ are the observed lines on the image plane.

7. The method of claim 6 wherein the combined point projection error and line projection error is determined, using the processor and memory, according the following formula:

$$E_{total} = w_{points} E_{points} + w_{lines} E_{lines} =$$
$$w_{points} \sum_i \|q_i - s_i\| + w_{lines}\left(\left\|\overrightarrow{n_{ae}} - \overrightarrow{n'_{ae}}\right\| + \left\|\overrightarrow{n_{bf}} - \overrightarrow{n'_{bf}}\right\|\right)$$

wherein $W_{points}$ and $W_{lines}$ are the weighting factors to balance the two kinds of errors.

8. The method of claim 1 wherein the environment is a warehouse.

9. The method of claim 8 wherein the object is an electric charging station for the robot in the warehouse.

10. A robot traveling in an environment, estimating a robot pose using two co-planar points (P1, P2) on an object plane on an object in the environment and two co-planar lines (P1-A, P2-B) on the object plane on the object, the robot comprising
a mobile base unit;
a camera mounted on the mobile base unit and configured to capture images of the environment, including images of the object;
a video decoder configured to receive the camera images from the camera, including images of the object and decode the images into decoded digital images, including decoded digital images of the object;
a processor; and
a memory storing instructions that, when executed by the processor, cause the robot to:
capture with the camera an image of the object in the environment;
convert the image of the object into a decoded digital image of the object disposed on an image frame;
identify on the decoded digital image of the object two observed points (op1, op2) corresponding to the two co-planar points (P1, P2) on the object;
identify on the decoded digital image of the object two observed image lines (op1-*a*, op2-*b*) corresponding to the two co-planar lines (P1-A, P2-B) on the object;
project onto the decoded digital image of the object the two co-planar points (P1, P2) on the object plane to obtain two projected co-planar image points (pp1, pp2) on the decoded digital image; and project onto the decoded digital image the two co-planar lines (P1-A, P2-B) on the object plane to obtain two projected co-planar image lines (pp1-*a*, pp2-*b*) on the decoded digital image;
determine a point projection error by comparing the two projected co-planar image points (pp1, pp2) to the corresponding observed points (op1, op2) on the decoded digital image of the object;
determine a line projection error by comparing the two projected co-planar image lines (pp1-*a*, pp2-*b*) to corresponding observed image lines (op1-*a*, op2-*b*) on the decoded digital image of the object; and
estimate a current robot pose if the point projection error and the line projection error are below a predetermined error threshold.

11. The robot of claim 10 wherein the memory further includes instructions that, when executed by the processor, cause the robot to combine the point projection error and the line projection error to establish a combined error, $E_{total}$, and comparing the $E_{total}$ to the predetermined error threshold.

12. The robot of claim 11 wherein the memory further includes instructions that, when executed by the processor, cause the robot to performing a non-linear optimization on the two observed points (op1, op2) relative to the two projected points (pp1, pp2) and the two observed image lines (op1-*a*, op2-*b*) and relative to the two projected co-planar image points (pp1, pp2) before determining the combined error, $E_{total}$.

13. The robot of claim 12 wherein if the combined error, $E_{total}$, is not less than the error threshold, the memory further includes instructions that, when executed by the processor, cause the robot to further perform a non-linear optimization on the two observed points (op1, op2) relative to the two projected points (pp1, pp2) and the two observed image lines (op1-*a*, op2-*b*) and re-determining the combined error, $E_{total}$.

14. The robot of claim 11 wherein the point projection error is determined using the following formula:

$$E_{points} = \sum_i \|q_i - s_i\|$$

wherein $q_i$ are the projected points on image plane and $s_i$ are the observed points on the image plane.

15. The robot of claim 14 wherein the line projection error is determined using the following formula:

$$E_{lines} = \left\|\overrightarrow{n_{ae}} - \overrightarrow{n'_{ae}}\right\| + \left\|\overrightarrow{n_{bf}} - \overrightarrow{n'_{bf}}\right\|$$

wherein $n_{ae}$ and $n'_{ae}$ are the projected lines on image plane and $n_{bf}$ and $n'_{bf}$ are the observed lines on the image plane.

16. The robot of claim 15 wherein the combined point projection error and line projection error is determined using the following formula:

$$E_{total} = w_{points}E_{points} + w_{lines}E_{lines} =$$

$$w_{points}\sum_{i}\|q_i - s_i\| + w_{lines}\left(\left\|\overrightarrow{n_{ae}} - \overrightarrow{n'_{ae}}\right\| + \left\|\overrightarrow{n_{bf}} - \overrightarrow{n'_{bf}}\right\|\right)$$

wherein $W_{points}$ and $W_{lines}$ are the weighting factors to balance the two kinds of errors.

17. The robot of claim 10 wherein the environment is a warehouse.

18. The robot of claim 17 wherein the object is an electric charging station for the robot in the warehouse.

\* \* \* \* \*